Aug. 26, 1941.                H. VOLKS                    2,253,834
                      GAS-HEATED COOKING GRILL
                       Filed Dec. 26, 1939          3 Sheets—Sheet 1
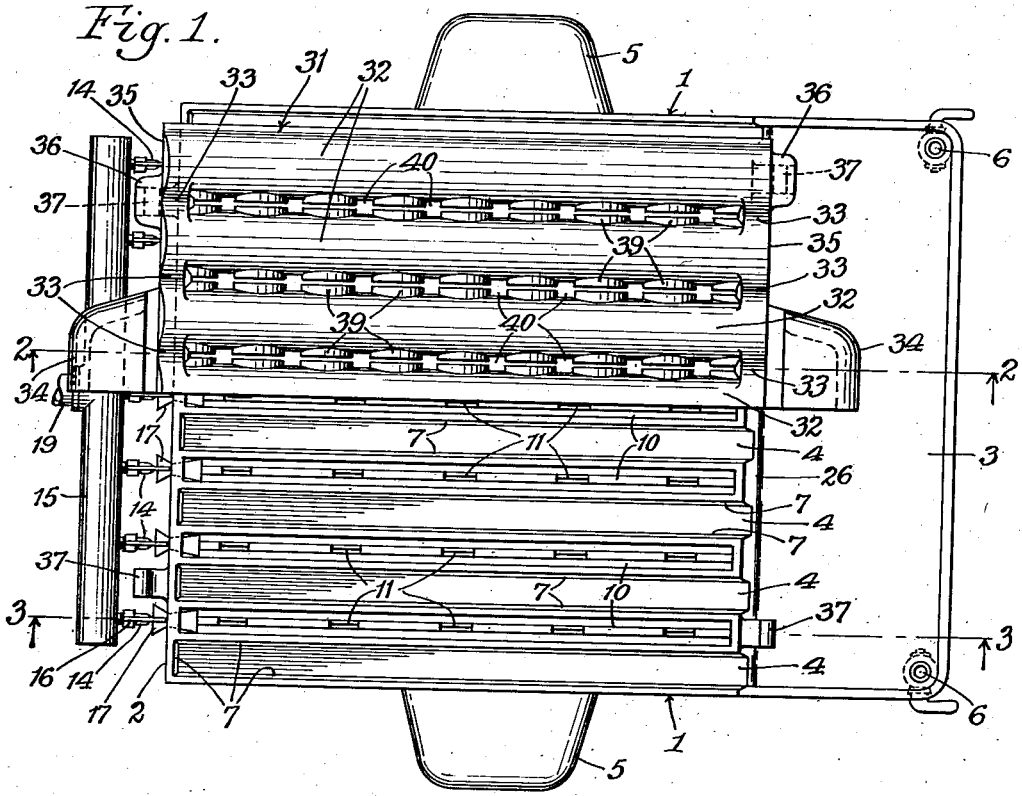
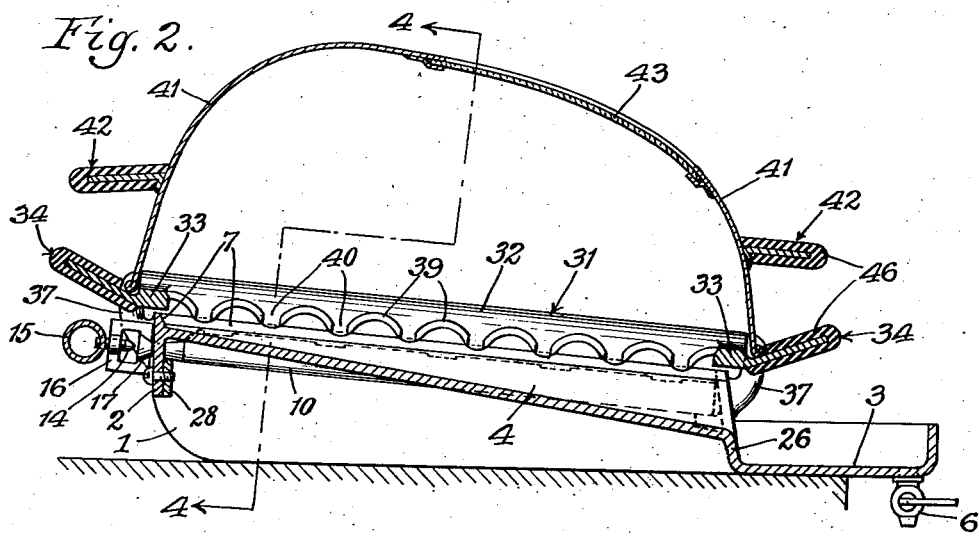
Inventor.
Herbert Volks.
by Parker & Carter
Attorneys.

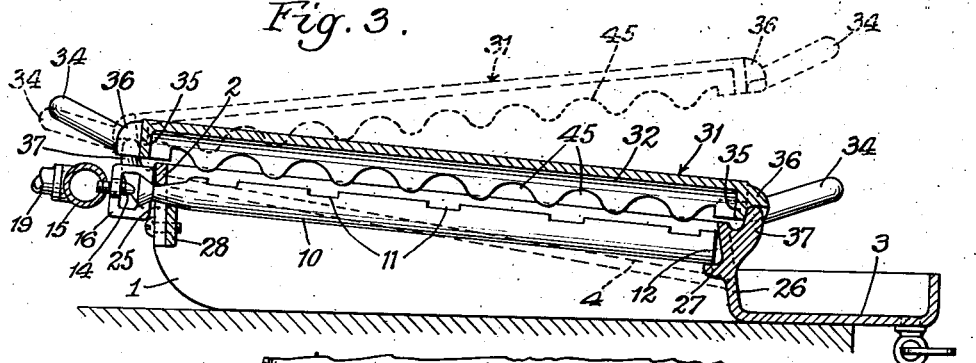
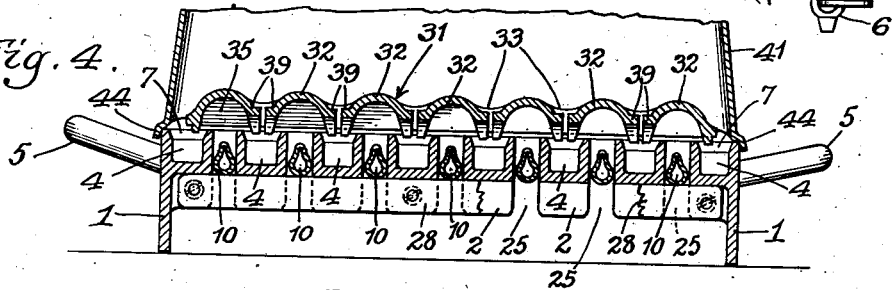
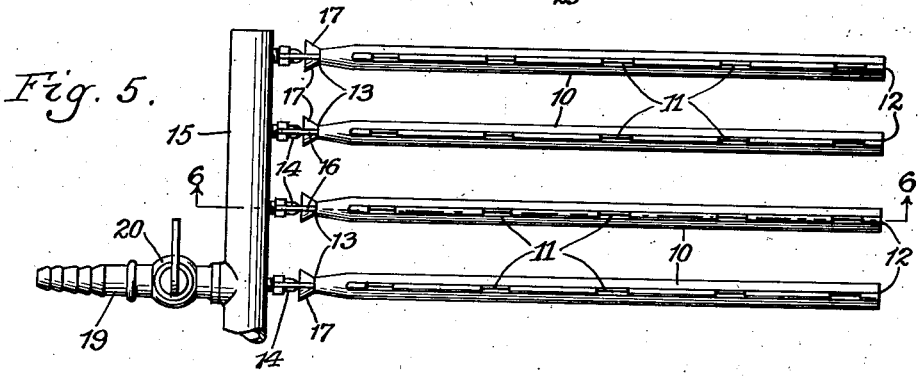
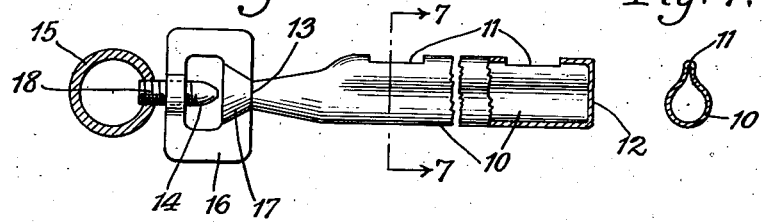
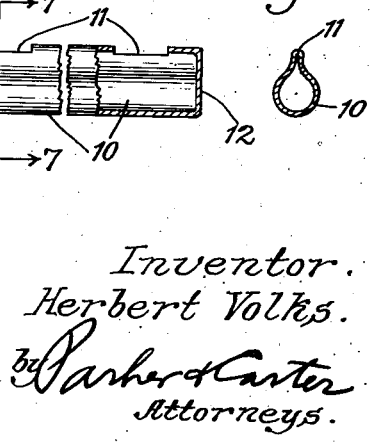

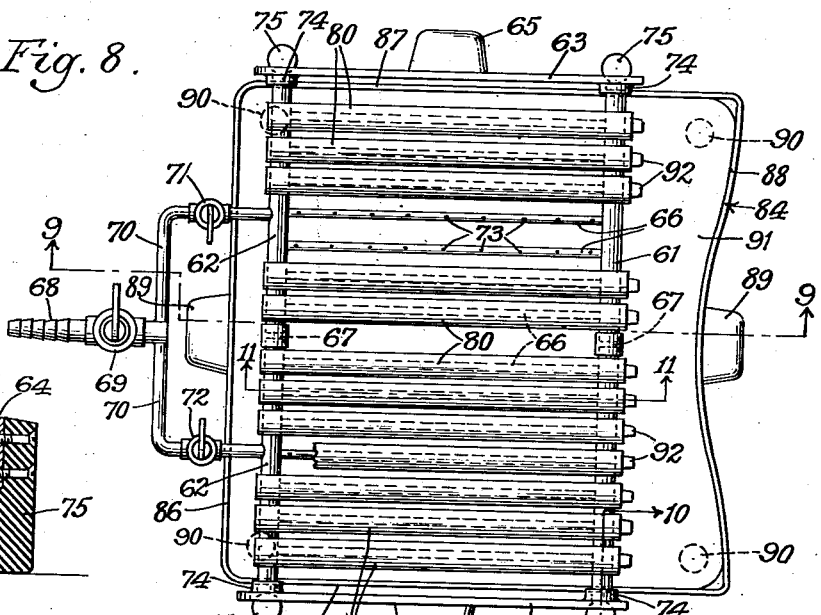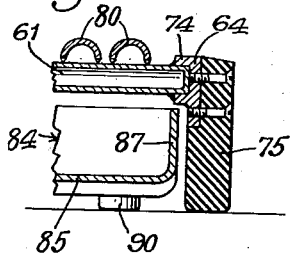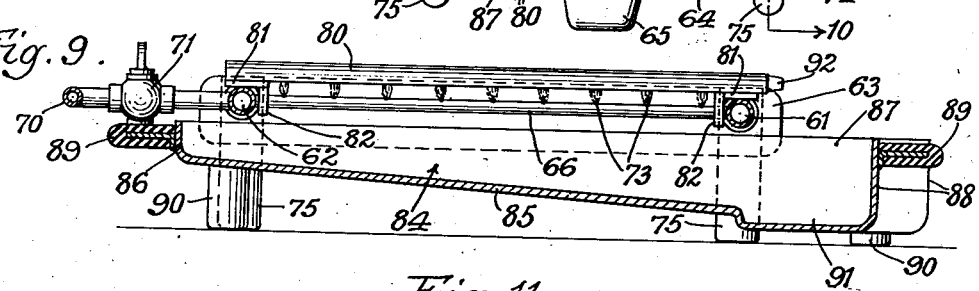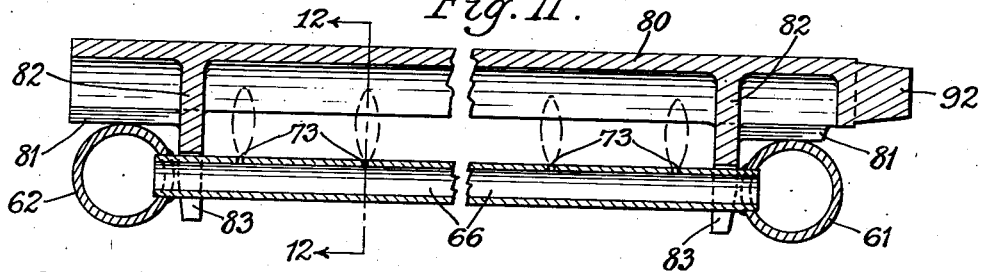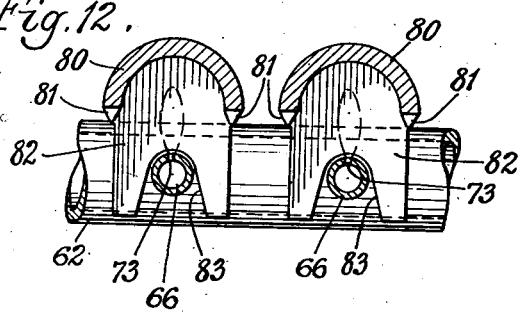

Patented Aug. 26, 1941

2,253,834

UNITED STATES PATENT OFFICE 2,253,834

GAS-HEATED COOKING GRILL

Herbert Volks, Zurich, Switzerland, assignor to Sulzer Freres, Societe Anonyme, (also known as Sulzer Bros. Ltd.), Winterthur, Switzerland, a corporation of Switzerland Application December 26, 1939, Serial No. 310,952

8 Claims. (Cl. 126—41)

My invention relates to improvements in cooking grills, and has for one object to provide a new and improved form of cooking grill, wherein, the food-supporting grill or grid element is removable; wherein, individual elements are conveniently removable for cleaning; wherein, grease, juices, and other liquids which may run off the food being cooked, may be rapidly removed out of contact with the heat source so as to limit, or entirely prevent, smoking and the like.

Another object of my invention is to provide a gas-heated grill, which is especially suited for use in restaurants, hotels and the like.

Other objects of the invention will appear from time to time in the specifications and claims.

My invention is illustrated more or less diagrammatically in the accompanying drawings, wherein:

Figure 1 is a plan view with parts broken away.

Figure 2 is a section along the line 2—2 of Figure 1.

Figure 3 is a section along the line 3—3 of Figure 1.

Figure 4 is a section with parts omitted along the broken line 4—4 of Figure 2.

Figure 5 is a plan view of the gas burner.

Figure 6 is a section on an enlarged scale along the line 6—6 of Figure 5.

Figure 7 is a section along the line 7—7 of Figure 6.

Figure 8 is a plan view with parts omitted of a modified form of the device.

Figure 9 is a section along the line 9—9 of Figure 8.

Figure 10 is a section along the line 10—10 of Figre 8.

Figure 11 is a section along the line 11—11 of Figure 8.

Figure 12 is a section along the line 12—12 of Figure 11.

Like parts are indicated by like characters in the various figures.

The combined grill support and grease collecting element is associated with a removable grid, a heating element and a cover.

1—1 indicates the side walls of the combined support and grease collector, preferably cast integral with these side walls, is a back wall 2, and a grease cup or well 3 with a plurality of downwardly inclined grease channels 4 extending from the back wall 2 downwardly and forwardly to discharge into the grease well 3. 5—5 are handles projecting from the side walls 1—1 whereby the entire assembly may be carried. 6 is a grease tap associated with the grease well by which grease may be conveniently withdrawn. The grease channels 4 are preferably generally rectangular in cross section, their interior walls being chamfered as indicated at 7.

The grease channels are thus supported at their opposed ends only, and there is a space between each pair of grease channels, in which is located a burner pipe 10 of generally pear-shaped or tear-drop cross section, as indicated in Figure 7. The upper, narrow edge of this tube is provided with a series of apertures 11 through which the gas may be discharged. Each of these tubes is closed at one end, as at 12, and is provided at the other end with a Venturi tube extension 13, into which discharges a gas nozzle 14 from a fixed gas pipe 15. 16 is a yoke mounted on the nozzle 14, engaging and supporting the collar 17 of the Venturi tube 13. There is, of course, clearance between the gas nozzle and the throat of the Venturi so that the gas rushing out under pressure will entrain and mix with it a suitable amount of air to support combustion so that an especially hot flame of the Bunsen-burner type is obtained at each aperture 11. The nozzle 14 is threaded at 18, the yoke 16 is in threaded engagement with it so that by rotating the yoke the nozzle can be moved toward and from the throat of the venturi so as to adjust the air-gas mixture. Gas is supplied to the pipe 15 through any suitable flexible member, not shown, but adapted to be fitted onto the extension 19 and the flow of gas may be controlled by the valve 20.

The back wall of the supporting frame is slotted as at 25. The front wall 26 is provided with a lug 27. 28 is a tie plate, bolted to the wall 25 so that each tube is supported at one end on the ledge 27 and on the other end by the tie plate 28 and the burner may be removed, when desired, by first removing the tie plate 28.

31 is a cooking grid, comprising a plurality of inverted channel-shaped grid members 32 joined at their ends by webs 33 to form an integral structure, and handles 34 are associated with said structure at each end of the grid. The webs 33 are associated with the downwardly extending walls 35, which walls carry lugs 36 socketed on lugs 37, extending outwardly and upwardly from walls 2 and 26 of the supporting frame, whereby the grid may be bodily removed or rotated upwardly for inspection of the flame, as indicated by the dotted lines in Figure 3.

Extending outwardly from the opposite sides of the grid members 32 are arched shoulders 39. These shoulders define relatively short apertures 40 between each pair of grid bars. Grease, juices and the like traveling down along the curved surface of the bar 32 will be deflected by the arches 39 and discharge through the apertures 40 into the grease channels 4. Thus there is a path for gas and heated air through the space between the chamfered edges 7 of the grease channels and upwardly through the spaces between the adjacent grid bars 32. The flame impinges upon the under sides of the members 32, and will never be in direct contact with the food or material supported upon the grid, and the grease will run off of the grid bars 32 into the spaces defined by the grease channels between the burners below the flame, so that the grease will be exposed to a minimum of heat and will rapidly run out into the grease well, and thus smoking and smells will be reduced to a minimum.

The handles are preferably insulated as indicated at 46. 41 is a cover, having handles 42 and a window 43. This cover rests upon the grid or grill, the handles 46 being recessed to assist in positioning it. The cover is flanged, as at 44, to overlie the walls 1. The downwardly extending edges of the grid bars 32 terminate in a wavy line, as indicated at 45, so as to increase the clearance between the grease channels and the under sides of the grid to permit free circulation.

In the modified form shown in Figures 8 to 12 inclusive, the two parallel gas supply pipes 61 and 62 are closed at their ends and joined by the cross bars 63 and 64 carrying handles 65. Joining these pipes 61 and 62 are a series of smaller, apertured burner pipes 66 in gas-tight connection at their ends with pipes 61 and 62. The pipes 61 and 62 are preferably closed interiorly as indicated at 67. Gas may be introduced through any suitable, flexible hose through the extension 68, and thence flows through the main valve 69 to the header 70, and thence from each end of the header through valves 71 and 72 to each end of the pipe 62; thence through the pipes 66 to pipe 61. The pipes 66 are provided with a plurality of jet apertures 73. The connection between the pipes 61 and the pipes 66 serves as a pressure and flow equalizing device.

The pipes 61 and 62 are socketed as indicated at 74 in the cross bars 63 and 64. The legs 75 are fastened to the cross bars to support the burner assembly in position as indicated. The pipes 61 and 62 have a dual function. They serve as a part of the gas-supply system, but they also serve as a support for the grid bars as will now appear.

Each grid bar 80 is a unit, and takes the form of a downwardly open channel 80. Each bar has on each end downwardly inclined lugs 81 in continuation with the walls of the channel and adapted to rest upon the pipes 61 and 62 respectively. At right angles to these lugs, at each end of the grid bar is a wall 82, slotted at 83 to straddle the pipe 66 so that each separate grid bar is held in the correct position above one of the burner pipes, there being clearance between each pair of grid bars. 84 is a grease pan having a downwardly inclined floor 85, a back wall 86, side walls 87, a front wall 88, and handles 89. This grease pan rests on legs 90 and terminates in a downwardly extending grease well 91, and is so disposed that it catches any grease or juices which may flow down over the grid bars between the burner pipes, thereby reducing to a minimum the danger of smoking and smells, because the grease is never exposed to the direct heat of the flame and passes down immediately to the grease pan below it.

A cover may be placed over the grill just as in the connection with the form disclosed in Figures 1 and 2. The grease pan may be withdrawn for removal of the grease and the individual grid bars may be separately removed for cleaning, but, in this form, the grid as a unit cannot be removed from the structure, though any individual grid bar may be separately removed, or may be rotated or raised for inspection of the flame as desired by the use of the lug 92.

Since this structure is especially well adapted for large installations, it sometimes happens that not all of the grill needs to be used, and under these circumstances, valves 71 and 72 may be manipulated to turn off the gas on a part of the installation with the closures 67 in the pipes 61 and 62, making this possible.

I claim:

1. In a cooking grill, a supporting frame having a plurality of walls, a grease well projecting forwardly from one wall, spaced grease channels extending rearwardly and upwardly from said wall to the opposite wall and adapted to discharge into the grease well, the latter wall being slotted in line with the spaces between the channels.

2. In a cooking grill, a supporting frame having a plurality of walls, a grease well projecting forwardly from one wall, spaced grease channels extending rearwardly and upwardly from said wall to the opposite wall and adapted to discharge into the grease well, the latter wall being slotted in line with the spaces between the channels, and lugs projecting rearwardly from the first-mentioned wall between the channels, each lug, forming with the opposed walls of the two channels, between which it is located, a pocket adapted to contain and support the end of a burner tube.

3. In a cooking grill, a supporting frame having a plurality of walls, a grease well projecting forwardly from one wall, spaced grease channels extending rearwardly and upwardly from said wall to the opposite wall and adapted to discharge into the grease well, the latter wall being slotted in line with the spaces between the channels, a gas burner, including a pipe located between a pair of channels, socketed in the slot in the wall, and removable means for closing the slot to hold the burner in place.

4. In a cooking grill, a supporting frame having a plurality of walls, a grease well projecting forwardly from one wall, spaced grease channels extending rearwardly and upwardly from said wall to the opposite wall and adapted to discharge into the grease well, the latter wall being slotted in line with the space between the channels, and lugs projecting rearwardly from the first-mentioned wall between the channels, a gas burner including a pipe located between a pair of channels, socketed in the slot in the wall at one end, resting on one of the lugs at the other end, and removable means for closing the slot to hold the pipe in place, each lug together with the walls of the channels between which it is located, forming a pocket to contain and position the opposed end of the pipe.

5. In a cooking grill, a supporting frame having a plurality of walls, a grease well projecting forwardly from one wall, spaced grease channels extending rearwardly and upwardly from said wall to the opposite wall and adapted to discharge into the grease well, the latter wall being slotted in line with the spaces between the channels, a gas burner pipe located between a pair of channels, means for supporting the pipe at each end, one end of the pipe being below the channel floor, the other end of the pipe being above the floor, the walls extending about and entirely enclosing the grease channels, the channel elements being located entirely below the level of the grease walls.

6. In a cooking grill, a supporting frame having a plurality of walls, a grease well projecting forwardly from one wall, spaced grease channels extending rearwardly and upwardly from said wall to the opposite wall and adapted to discharge into the grease well, the latter wall being slotted in line with the spaces between the channels, a gas burner pipe located between a pair of channels, less sharply inclined to the horizontal than is the floor of the channel, the walls extending about and entirely enclosing the grease channels, the channel elements being located entirely below the level of the grease walls.

7. In a cooking grill, a food supporting grid including a plurality of downwardly channelled grid bars joined at their ends, having generally cylindrical upper surfaces, arched projections extending outwardly from exposed sides of each bar toward the adjacent bar, the projections on adjacent bars being aligned with but out of contact with one another, the grid bars and projections defining substantially rectangular apertures joined by narrow slots between the arched projections, the arched projections being located substantially below the upper portion of the grid bars.

8. In a cooking grill, a food supporting grid including a plurality of truncated cylindrical grid bars channelled on their under sides, joined at their ends, arched projections extending from the outer side walls of the bars below the upper portions thereof, the projections on adjacent bars being aligned with but out of contact with one another, the channels and projections defining a series of rectangular apertures joined by relatively narrow slots.

HERBERT VOLKS.